Nov. 15, 1966   E. E. HABIB   3,285,768
FABRIC COATED WITH SURFACE DEFORMED FOAM
Filed July 18, 1962
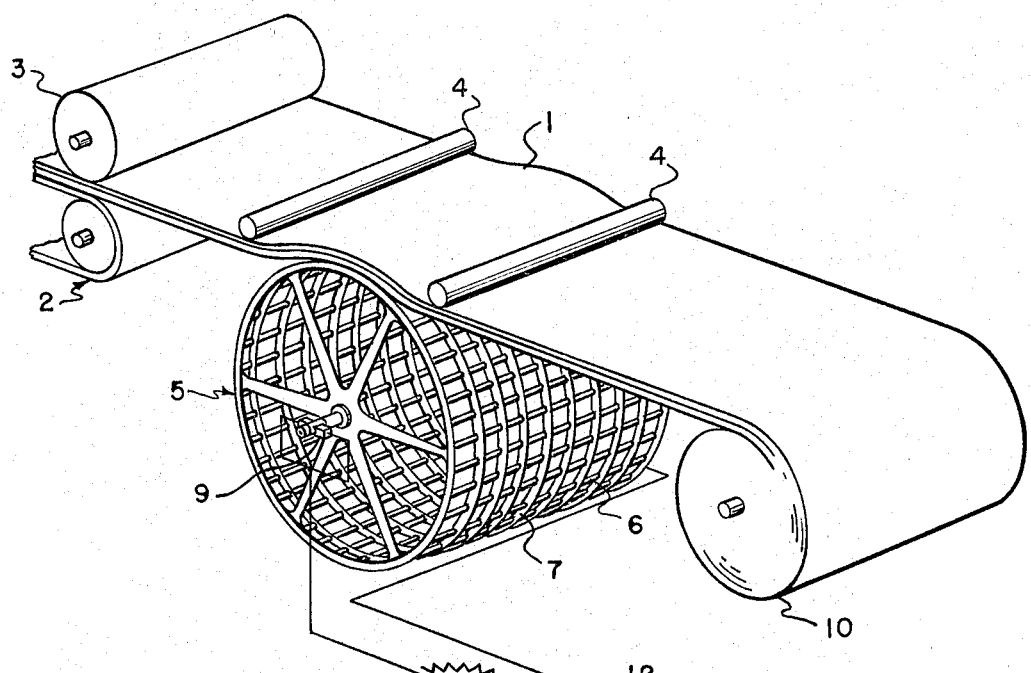
FIG.-1-
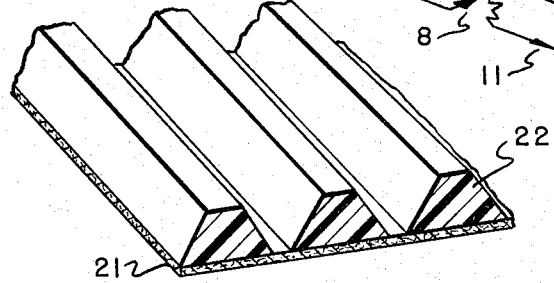
FIG.-2-
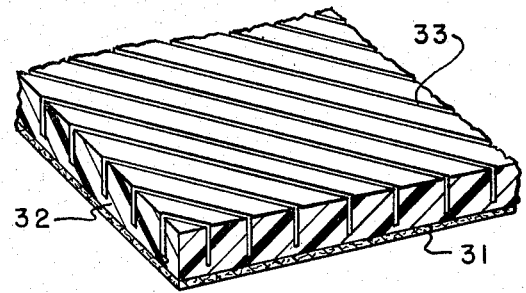
FIG.-3-
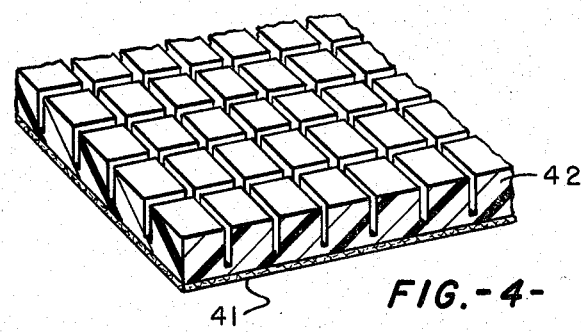
FIG.-4-
INVENTOR.
EMILE E. HABIB
BY
ATTORNEY

3,285,768
FABRIC COATED WITH SURFACE DEFORMED FOAM
Emile E. Habib, Spartanburg, S.C., assignor to Deering Milliken Research Corporation, Spartanburg, S.C., a corporation of Delaware
Filed July 18, 1962, Ser. No. 210,803
9 Claims. (Cl. 117—11)

This invention relates to foam backed fabrics and more specifically to polymeric resin foam backed fabrics having improved flexibility and drape.

Polymeric resin foam backed fabrics are well known to the textile industry. A relatively recent application, however, of foam backed fabrics and especially of polyurethane foam backed fabrics is in the field of outerwear insulation garments Drape and flexibility are important features of foam backed fabrics used in the manufacture of outerwear, and in order to improve these features, various efforts have been made either to diminish the thickness of the foam or to vary the medium used in joining the foam to the textile base. None of the efforts heretofore employed in attempting to increase the flexibility and drape of foam backed fabrics have been entirely successful. The problem of increasing the drape and flexibility of a foam backed fabric is compounded by the fact that treatments carried out on the polymeric resin foam backed fabric should not diminish the bond between the foam and the fabric nor diminish the insulation value of the foam.

It is therefore one object of this invention to increase the pliability and drape of foam backed fabrics.

It is another object of this invention to increase the pliability and drape of foam backed fabrics by means of dimensionally patterning the foam layer.

It is still another object of this invention to increase the pliability and drape of a foam backed fabric in a preselected direction by means of dimensionally patterning the foam backed fabrics.

It is a further object of this invention to improve the durability of foam backed fabrics.

Other objects and advantages of this invention will become apparent from the following detailed description.

While any polymeric resin which will retain a stable foamed configuration such as for instance natural and synthetic rubber foams and the like are suitable for use in the improved foam backed fabric of this invention, the preferred foam is a polyurethane foam. The reasons for a preference for polyurethane are that polyurethanes are able to withstand dry cleaning operations and are able to withstand high temperatures with a minimum of deterioration.

The polyurethane employed in a polyurethane foam backed textile is the reaction product of an organic diisocyanate with a resin of the polyester or polyether class. The diisocyanate reaction product is foamed by either of two systems, the most common of which is the carbon dioxide blown process. In this method, the excess of isocyanate left over from the reaction of isocyanate and the resin, reacts with a small quantity of water to release carbon dioxide. This causes an expansion or foaming of the mass into the cellular material. The second method does not rely basically upon the liberation of carbon dioxide to create the foaming action. In the second process no water is used. In place of water a fluorinated hydrocarbon is added to the mixture of isocyanate and resins producing a bubble-like foam material.

The polyurethane foam is usually formed by casting the liquid compound into a slab, curing after foaming and then slitting to the desired thickness. The sheet of polyurethane foam may be laminated to a fabric backing by either one of two systems. The principal lamination system is known as flame lamination and involves subjecting the polyurethane to a butane gas flame which melts the foam creating a tacky surface. The foam is then slightly cooled by passing it over a cold roller and feeding it simultaneously with the fabric to which it is to be bonded into a nip roller which forces the two materials together creating a bond. The second laminating system is known as the adhesive system and involves the application of an adhesive to the polyurethane sheet or the cloth backing, or both, by means of a roller, spray knife, rotogravure or other technique. The polyurethane sheet is then laminated to the fabric backing, dried if necessary and cured in some instances depending upon the adhesive used.

An alternative system for the production of a polyurethane foam backed fabric is to coat a fabric with unfoamed polyurethane, doctor the coating to a level superstrate and then foam the polyurethane in place. This system which is relatively simple does not always produce a uniform product in that the nonuniformities existing in the fabric backing are accentuated when the polyurethane coating is foamed in place. The polyurethane foam backed fabrics produced by a laminating process are therefore the preferred polyurethane foam backed fabrics of the textile industry.

In accordance with this invention, it has now been discovered that foam backed fabrics of increased drape, flexibility and durability may be produced by breaking the continuity of the foam layer. It should be understood that the phrase "breaking the continuity" means a physical separation but does not include a separation effected by compression such as the compression produced by an embossing roll. Compressing and thereby increasing the density of the foamed portion of a foam backed fabric diminishes the drape and flexibility of the fabric. The broken continuity of the foam layer of this invention is therefore accomplished without substantially changing the density of any portion of the foam which remains in the finished product. The continuity of the foamed layer may be broken by use of operations such as slashing and grooving. The term "slashing" as used herein is meant to define a simple cutting operation wherein substantially no foamed material is removed. The term "grooving" as used herein is meant to define an actual removal of foam. Grooving operations may be carried out by cutting or burning the foam. Suitable burning means are means such as for instance a heated screen, a heated plate, a heated roll cutter and the like. The temperature of the burning means must be high enough to remove polyurethane foam, however, the burning means may be adjusted either mechanically or thermally so that the foam will be burned to a predetermined depth.

The pattern in which the continuity of the foam is broken will determine the degree and the direction of the flexibility and drape of the foam backed fabric. If it is desired that the fabric have flexibility in both the warp and fill directions a design such as for instance a substantially rectilinear one may be employed. However, if it is desired that the fabric have substantially increased flexibility in one direction only, or if it is desired that the fabric have different directional degrees of flexibility, a major amount of foam may be slashed or grooved in one direction and a minor amount in the other. Different drape and pliability results may also be produced by having the foam discontinuity pattern substantially parallel the warp and fill yarns of the fabric or by having the pattern at an angle to the warp and fill yarns of the fabric or by having a multi-directional pattern which does not have any relationship to the warp and fill yarns of the fabric. The pattern may be a regularly reproduced geometric design or may be a random figure of no particular geometric construction. The foam may be slashed or grooved to a portion of its depth in any desired pattern and then laminated to the fabric. It is preferred that the means employed for breaking the foam continuity carry the entire pattern which is desired on the foam component of the fabric. It is obvious that the number of breaks, the depth of the breaks and the geometrical design of the breaks determine the ease with which the fabric may be bent in any given direction. This ability to control drape is of course an important feature in garment manufacture.

The breaking of the continuity of the foamed component of the fabric has advantages other than increasing drape and flexibility. The fabric to which the foam has been adhered can shrink if wetted to as much as 10% depending upon the nature of the fabric. This shrinkage of the fabric may result in buckling, distortion and even delamination of the foam layer. Flexing of the foam backed textile may also set up strains sufficient to rupture the foam to fabric bond. When the continuity of the foamed layer is broken, however, and especially if the depth of the break is to the surface of the fabric, the stresses set up by shrinkage and flexing are inhibited. For purposes of relieving stresses in the foam backed fabric, it is preferred that the foamed layer be grooved to a depth and size sufficient to expose substantially foam-free fabric areas. These free fabric areas take up most of the strain when the laminate is flexed and also provide an area in which the fabric may shrink without setting up delaminating forces.

The apparatus employed in producing the foam backed fabric of increased drape and flexibility may be any apparatus having the ability to break the continuity of the foam layer. Preferably the apparatus is of a type which can break the continuity of a continuous running length of foam backed fabric. A means which has been found suitable for this type of operation is an apparatus employing a roll carrying member such as for instance burning and slashing members. The running length of foam backed fabric is held in contact with the roll by suitable tensioning devices and that design which is carried by the roll is transferred to the foam layer by breaking the continuity of the foam layer to a predetermined depth and geometry.

The various embodiments of this invention will become more apparent from a discussion of the drawings. In the drawings:

FIGURE 1 is a projected diagrammatic view of one type of apparatus suitable for manufacturing the broken continuity foam backed fabric of this invention. FIGURE 2 is a fragmentary view in perspective showing one type of broken continuity pattern formed on foam backed fabric. FIGURES 3 and 4 are fragmentary views in perspective showing types of broken continuity pattern effects produced on foam backed fabrics.

In FIGURE 1, a foam backed fabric supported on a continuous belt 2 in a manner such that the foam portion of the fabric 1 is face down on the belt 2, and is passed between the nip of a roll 3 and the drive wheel of the endless belt 2. The foam backed fabric 1 is passed over a rotatable heated wire roll or cage 5 under suitable tension provided by tensioning rolls 4. The heated wire cage 5 has longitudinal members 6 made of high electrical resistance material such as nichrome or the like and annular members 7 made of high heat conductive material such as copper and the like. The wire cage is heated by an electric current delivered from a suitable source of electricity to current carrying means 11 and 12. The heat of wire cage 5 is adjusted by means of a rheostat 8, electric contact being made with wire cage 5 by means of brush members 9, each side of the wire cage 5 having a brush member. The heated wire portions of the wire cage 5 make contact with the foam portion of the fabric 1 and burn a pattern into the foam, the pattern, of course, being dependent upon the wire pattern of the wire cage 5. The patterned foam backed fabric is then wound on a take-up roll 10.

In FIGURE 2, a fabric 21 has foam portions 22 disposed thereon. The foam portions 22 are in the shape of a truncated pyramid, the truncated pyramid configuration having been produced by cutting substantially V-shaped grooves into the foam surface. As can be seen from the figure, a greater degree of flexibility is provided when the fabric is bent back upon the polyurethane laminate side. The substantially V-shaped grooves cut into the foam surface allow a greater degree of flexibility than would be present if the grooves had straight walled sides.

In FIGURE 3, a fabric 31 has a foam portion 32 disposed thereon. The continuity of the foam portion 32 is broken by slashes 33. As can be seen from the figure, a high degree of flexibility is provided when the fabric is bent away from the foam layer although the flexibility is substantially unchanged, from that of a nonslashed foam backed fabric, when bent toward the foam layer.

In FIGURE 4, a fabric 41 has a patterned foam portion 42 disposed thereon. The foam portion 42 has grooves, which run in either one of two well defined directions, the grooves providing flexibility in these two directions, that is to say, in the event that the fabric 41 is a woven fabric, and the grooves follow either the warp or the fill direction of the fabric, the fabric will have flexibility in both the warp and the fill direction.

While burning is the preferred system for breaking the continuity of the foam, it should be understood that other systems or combination of systems may be employed. It has been found that cutting is a suitable means for effecting continuity breaks in foam and also that cutting in addition to burning may be combined in a single foam treatment operation. As cutting lends itself more readily to breaking foam continuity along the longitudinal axis of the traveling foam backed fabric, a cutting system may be employed for breaking foam continuity along the longitudinal axis while burning may be employed for foam removal along lines opposed to the longitudinal axis.

The degree to which the continuity of the foam component is broken in depth and width may vary from merely slashing the surface of the foam to a preselected depth to groove type removal of extensive areas of the foamed material of preselected depth and width. The upper limit of foam removal is dependent, of course, on a balancing out of the properties desired, that is a balancing between flexibility and thermal insulation. A V-shaped or U-shaped groove is the preferred configuration for foam removal in that the grooves provide superior flexibility. The grooves, however, may be straight walled or may employ a combination of straight wall and V-shaped grooves or U-shaped grooves. The grooves themselves may follow a straight line or may be curved and may be continuous or discontinuous. For ease of operation, the groove pattern is usually laid out in continuous straight lines. When slashes rather than foam removal are employed to break the continuity of the foam, the slashes may be perpendicular to the laminated face of the foam or may be at angles of varying degrees to the laminated face of the foam. The angle of the slash may be constant or may vary within the same foam backed fabric. The slashes may follow a straight line or a curved line and may be continuous or discontinuous. For ease of operation, it is preferred that the slashes be continuous, follow a straight line and be perpendicular to the laminated face of the foam component.

Finished articles of apparel such as carcoats, outerwear jackets, raincoats and the like prepared from foam backed fabric having broken continuity in the foam layer have qualities which are vastly superior to the same articles prepared from foam backed fabrics made in the conventional manner. Articles of apparel prepared from the foam backed fabric of this invention allow the wearer more freedom of movement and also permit the manufacturer of the article to shape the finished article along the lines of body contours. The finished article prepared from the foam laminated fabric of this invention will also withstand greater amounts of flexing during wear and cleaning operations without puckering or delaminating.

What is claimed is:
1. A foam backed apparel fabric of enhanced drape and flexibility consisting of a fabric having warp and fill yarns coated with a foam layer of substantially uniform density wherein the continuity of said foam is broken substantially along the direction of the warp yarns of said fabric to a depth sufficient to increase the flexibility of said foam backed fabric.
2. The foam backed fabric of claim 1 wherein the continuity of said foam is broken to a depth and degree sufficient to expose substantially foam free fabric areas.
3. The foam backed fabric of claim 1 wherein the foam is comprised of polyurethane.
4. A foam backed apparel fabric of enhanced drape and flexibility consisting of a fabric having warp and fill yarns coated with a foam layer of substantially uniform density wherein the continuity of said foam is broken substantially along the direction of the fill yarns of said fabric, said foam being broken to a depth sufficient to increase the flexibility of said foam backed fabric.
5. The foam backed fabric of claim 4 wherein the continuity of said foam is broken to a depth and degree sufficient to expose substantially foam free fabric areas.
6. The foam backed apparel fabric of claim 4 wherein the foam comprises polyurethane.
7. A foam backed apparel fabric of enhanced drape and flexibility consisting of a fabric having warp and fill yarns coated with a foam layer of substantially uniform density wherein the continuity of said foam is broken substantially along the direction of the warp yarns and substantially along the direction of the fill yarns of said fabric to a depth sufficient to increase the flexibility of said foam backed fabric.
8. The foam backed fabric of claim 7 wherein the continuity of said foam is broken to a depth and degree sufficient to expose substantially foam free fabric areas.
9. The foam backed fabric of claim 7 wherein the foam is comprised of polyurethane.

References Cited by the Examiner

UNITED STATES PATENTS

| | | | |
|---|---|---|---|
| 2,526,650 | 10/1950 | Gaipel | 219—19 |
| 2,662,033 | 12/1953 | Andrews | 117—8 |
| 2,727,128 | 12/1955 | Jaye | 219—19 |
| 2,785,739 | 3/1957 | McGregor et al. | |
| 2,841,205 | 7/1958 | Bird | 246—47 |
| 2,851,372 | 9/1958 | Kaplan et al. | 117—8 |
| 2,948,650 | 8/1960 | Jackson et al. | 161—159 X |
| 3,016,318 | 1/1962 | Sudman | 161—159 X |

WILLIAM D. MARTIN, *Primary Examiner.*

RICHARD D. NEVIUS, D. TOWNSEND, T. G. DAVIS,
*Assistant Examiners.*